United States Patent
Shofner, II

(10) Patent No.: US 8,347,616 B2
(45) Date of Patent: Jan. 8, 2013

(54) COMPRESSED AIR ENGINE AND POWER TRAIN SYSTEM

(76) Inventor: Frederick Michael Shofner, II, Shelbyville, TN (US)

(*) Notice: Subject to any disclaimer, the term of this patent is extended or adjusted under 35 U.S.C. 154(b) by 956 days.

(21) Appl. No.: 12/359,268

(22) Filed: Jan. 23, 2009

(65) Prior Publication Data
US 2009/0183504 A1 Jul. 23, 2009

Related U.S. Application Data

(60) Provisional application No. 61/062,020, filed on Jan. 23, 2008.

(51) Int. Cl.
*F16H 39/00* (2006.01)
*F04B 41/00* (2006.01)
(52) U.S. Cl. ............................. 60/370; 60/408
(58) Field of Classification Search .................. 60/408, 60/370, 412, 437
See application file for complete search history.

(56) References Cited

U.S. PATENT DOCUMENTS

| | | | | |
|---|---|---|---|---|
| 2,544,606 A | * | 3/1951 | Mallory | 60/408 |
| 3,426,523 A | * | 2/1969 | Straub | 60/408 |
| 3,693,351 A | * | 9/1972 | Minkus | 60/370 |
| 3,765,180 A | * | 10/1973 | Brown | 60/415 |
| 3,963,379 A | * | 6/1976 | Ueno | 417/237 |
| 3,980,152 A | * | 9/1976 | Manor | 180/313 |
| 4,014,172 A | * | 3/1977 | Jones | 60/650 |
| 4,018,050 A | * | 4/1977 | Murphy | 60/407 |
| 4,104,955 A | * | 8/1978 | Murphy | 91/176 |
| 4,123,910 A | * | 11/1978 | Ellison, Sr. | 60/412 |
| 4,370,857 A | * | 2/1983 | Miller | 60/413 |
| 6,367,247 B1 | * | 4/2002 | Yancey | 60/412 |
| 6,508,324 B1 | * | 1/2003 | Conley, Jr. | 180/165 |
| 6,629,573 B1 | * | 10/2003 | Perry | 60/407 |
| 6,862,973 B2 | * | 3/2005 | Rehkemper et al. | 91/325 |
| 7,315,089 B2 | * | 1/2008 | Lambertson | 290/1 A |

* cited by examiner

*Primary Examiner* — Thomas E Lazo
(74) *Attorney, Agent, or Firm* — Wayne Edward Ramage; Baker Donelson

(57) ABSTRACT

An engine and drive train system suitable for personal or commercial transportation vehicles. The system converts the expansive energy of compressed air or gas into mechanical energy to produce motion or force. The engine of the present invention further uses the intrinsic kinetic energy of the vehicle in motion to generate and store compressed air or gas for in-situ or later use. The engine may also be used for braking by the introduction of high pressure air or gas at maximum displacement.

20 Claims, 11 Drawing Sheets

COMPRESSED AIR ENGINE AND POWER TRAIN SYSTEM

This application claims priority to U.S. Provisional Patent Application No. 61/062,020, filed Jan. 23, 2008, entitled "Compressed Air System and Engine of Same With Associated Methods and Systems to Utilize the Energy of Compressed Air for Optimized Power or to Accumulated Same Energy and Store for Future Use, Whose In-Situ Birectional Phase Changes(s) Depends Solely Upon Acceleration or Deceleration of the Load," and is entitled to that filing date for priority. The complete disclosure, specification, drawings and attachments of U.S. Provisional Patent Application No. 61/062,020 are incorporated herein in their entirety by reference.

FIELD OF INVENTION

The present invention relates to a compressed air engine and related methods and systems.

BACKGROUND OF INVENTION

There are significant advantages to using compressed air engines over internal combustion engines. Compressed air as a fuel is relatively unlimited in availability compared to hydrocarbon-based fuels such as coal, natural gas, oil, and their derivative products. The latter fuels also have by-products as a result of their extraction and use that adversely affect the environment. Further, internal combustion engines that burn hydrocarbon fuels are very inefficient. The efficiency of an internal combustion engine powered vehicle has been estimated at less than ten percent based on energy delivered to the drive train wheels (see Efficient Use of Energy, K. W. Ford, et al. (eds.), American Institute of Physics (New York), p. 99-121).

Compressed air engines are well known in the art. Several exemplary configurations of compressed air engines are disclosed in U.S. Pat. Nos. 3,693,351; 3,765,180; 3,980,152; 4,104,955; 4,014,172 4,018,050; 4,370,857; 6,367,247; 6,508,324; 6,629,573; 6,862,973; and 7,315,089; the complete disclosures of which are incorporated herein in their entireties by specific reference for all purposes.

However, the energy density of compressed air is substantially lower than hydrocarbon-based fuels. Currently known compressed air engines with compressed air stored in reasonably-sized containers at reasonable pressures provide only a short time of operation before needing recharging (i.e., they have a short charge range), which is not practical or useful for motor vehicles with the current wide-ranging applications and demands. Longer periods of operation using the prior art require either a much larger volume of compressed air, or air stored at extremely high pressures, neither of which are practical or useful solutions.

These and other drawbacks are seen in the few air-powered cars now available in the marketplace. These cars are of much lighter weight and much smaller than typical internal combustion vehicles, which can result in safety issues on the road. The reduced mass, which may be as much as 80% less, is necessary to increase the charge range. These vehicles also have stated charge ranges of from 40 to 150 miles, with lower-speed "in-town driving" suggested or required to reach this advertised charge range. This is a function of the amount of energy required to overcome air drag, which increases with velocity, which prevents these use of these vehicles for longer trips at higher speeds.

Accordingly, what is needed is a compressed air engine and system that can deliver the power of an internal combustion engine with a charge range comparable to an internal combustion engine powered vehicle. It is to such a need that the present invention is directed.

SUMMARY OF THE INVENTION

In one exemplary embodiment, the present invention comprises an engine and drive train system suitable for personal or commercial transportation vehicles. The system converts the expansive energy of compressed air into mechanical energy to produce motion or force. The engine of the present invention further uses the intrinsic kinetic energy of the vehicle in motion, such as during vehicle deceleration or braking, to generate and store compressed air for in-situ or later use. In some exemplary embodiments, up to 50% to 99% of that energy is recaptured.

The engine of the present invention can be based on any of the types of engines known in the prior art, such as the reciprocating piston engine and the Wankel or rotary engine. The output shaft of the engine would be attached to an appropriately-sized flywheel, transmission, or wheel of a car, train, generator, or the like. When the accelerator (or power switch) is engaged, the engine runs on the compressed air or gas as fuel. In the case where the engine is placed in a vehicle, the vehicle is propelled. When the accelerator (or power switch) is disengaged, the intrinsic kinetic energy of the flywheel or vehicle in motion provides rotational mechanical energy back through the output shaft, causing the engine to compress and store compressed air or gas, thereby generating additional fuel.

In another exemplary embodiment, the engine in expanded compressor mode can be used as a brake for a vehicle. At maximum displacement, on-board high pressure air or gas is introduced into the piston or rotor chamber, and provides braking force as it is compressed. The volume of air introduced and the engagement of additional braking cylinders or rotors depends on the amount of braking force required. The air compressed as a result of the braking can be recaptured and stored.

DETAILED DESCRIPTION OF EXEMPLARY EMBODIMENTS

In one exemplary embodiment, the present invention comprises an engine and drive train system suitable for personal or commercial transportation vehicles. The system converts the expansive energy of compressed air into mechanical energy to produce motion or force. The engine of the present invention further uses the intrinsic kinetic energy of the vehicle in motion to generate and store compressed air for in-situ or later use. In some exemplary embodiments, up to 50% to 99% of that energy is recaptured.

The engine of the present invention can be based on any of the types of internal combustion or compressed air engines known in the prior art, such as the reciprocating piston engine and the Wankel or rotary engine. Generally speaking, a compressed air supply is connected to or forms part of a compressed air engine in such a way that compressed air can be supplied to the compressed air engine from the supply. The compressed air supply may include such functions as generating compressed air and storing compressed air. The compressed air engine extracts energy from the compressed air (typically in the form of driving the movement of a piston or rotor with the expansion of the compressed air) and produces power, such as through the rotation of a output shaft.

Figure 1:
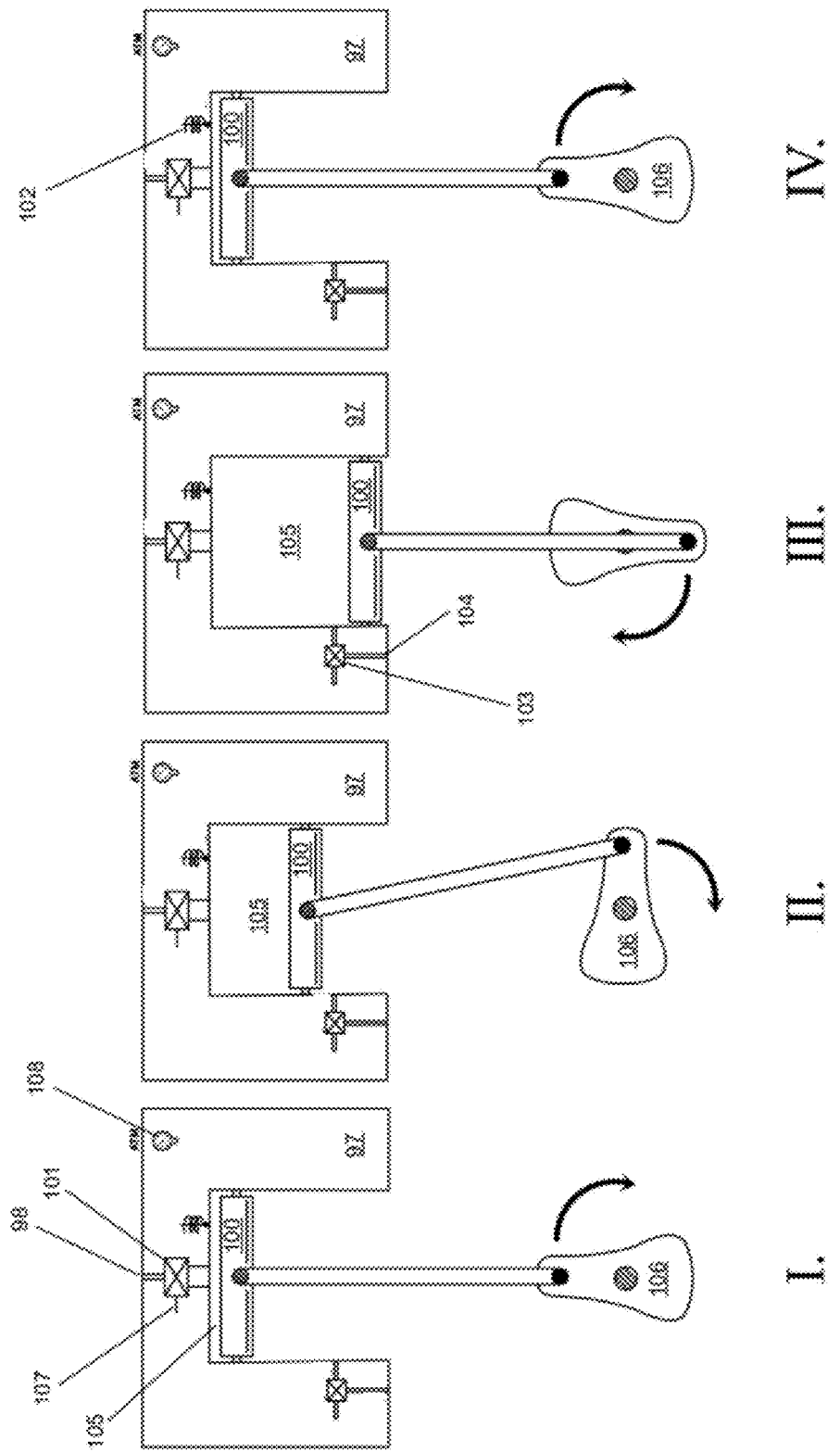
FIG. 1 is a cutaway view showing four phases of a piston stroke for a single piston in a reciprocating piston compressed air engine in accordance with an exemplary embodiment of the present invention.

FIG. 1 shows a complete stroke of a single piston in a simple reciprocating piston air engine in accordance with an exemplary embodiment of the present invention. A piston 100 in a piston chamber drives an output shaft 106. The pressure vessel 97 is pressurized with air. Pressured air may be input through valve port 98, or a separate fitting. In one example, the air is pressurized to approximately 2000 psi. In another exemplary embodiment, the air is at a pressure of approximately 4000 to 5000 psi, more particularly, 4300 psi. Gauge 108 may be used to monitor and/or control the pressure in the pressure vessel 97.

During acceleration or maintenance of speed (i.e., power mode), the accelerator (or power switch) is engaged. A relatively small, high pressure bolus of air introduced from the pressure vessel 97 through port 107 through valve 101 into the internal piston chamber volume 105. In one example, the bolus of air is from 2 to 10 cubic millimeters in volume, although the volume depends on the size of the piston chamber and the amount of pressure on (or deflection of) the accelerator (i.e., a greater deflection of the accelerator results in more compressed being introduced to produce faster acceleration). The valve 101 then closes, and the expanding air pushes the piston 100 out (the "up-stroke"), transferring the expansive energy into the mechanical energy of the output shaft 106 (see Position II). Valve 103 opens at or near the end of the bolus expansion (see Position III), allowing the volume 105 to normalize to atmospheric pressure through port 104. At the completion of the expansion phase, there will be either no exhaust or some pressure drop in the event the bolus did not return to atmospheric pressure, in which case the remaining air will evacuate. Due to rotational force, the piston 100 begins its return power stroke (the "down-stroke"). Valve 101 opens to the atmosphere to allow air in the piston to evacuate through port 98, to prevent compression as piston 100 returns (Position IV). The process is repeated indefinitely as long as the accelerator (or power switch) is engaged (i.e., the engine remains in power mode).

When the accelerator is released or disengaged, the engine becomes a compressor (i.e., compression mode). During the up-stroke, as the piston moves from Position I to Position III, the piston 100 draws air from the atmosphere into the volume 105 through valve 101 and port 98. Valve 103 remains closed. During the down-stroke, valve 101 closes, so the momentum transferred from the shaft 106 pushes the piston 100, compressing the air in the volume 105. When the compressed air exceeds a threshold pressure, valve 102 opens, introducing the compressed air from the volume into the pressure vessel 97. In one embodiment, valve 102 is a mechanical force-closed valve. The threshold pressure may be approximately 2000 psi or above, depending on the pressure desired in the pressure vessel 97. Valve 102 closes as the pressure in the volume 105 drops, and the up-stroke begins again. This process repeats until the output shaft has stopped providing power (i.e., no velocity, the vehicle has stopped), or the accelerator is engaged, returning the engine to power mode.

Figure 2:
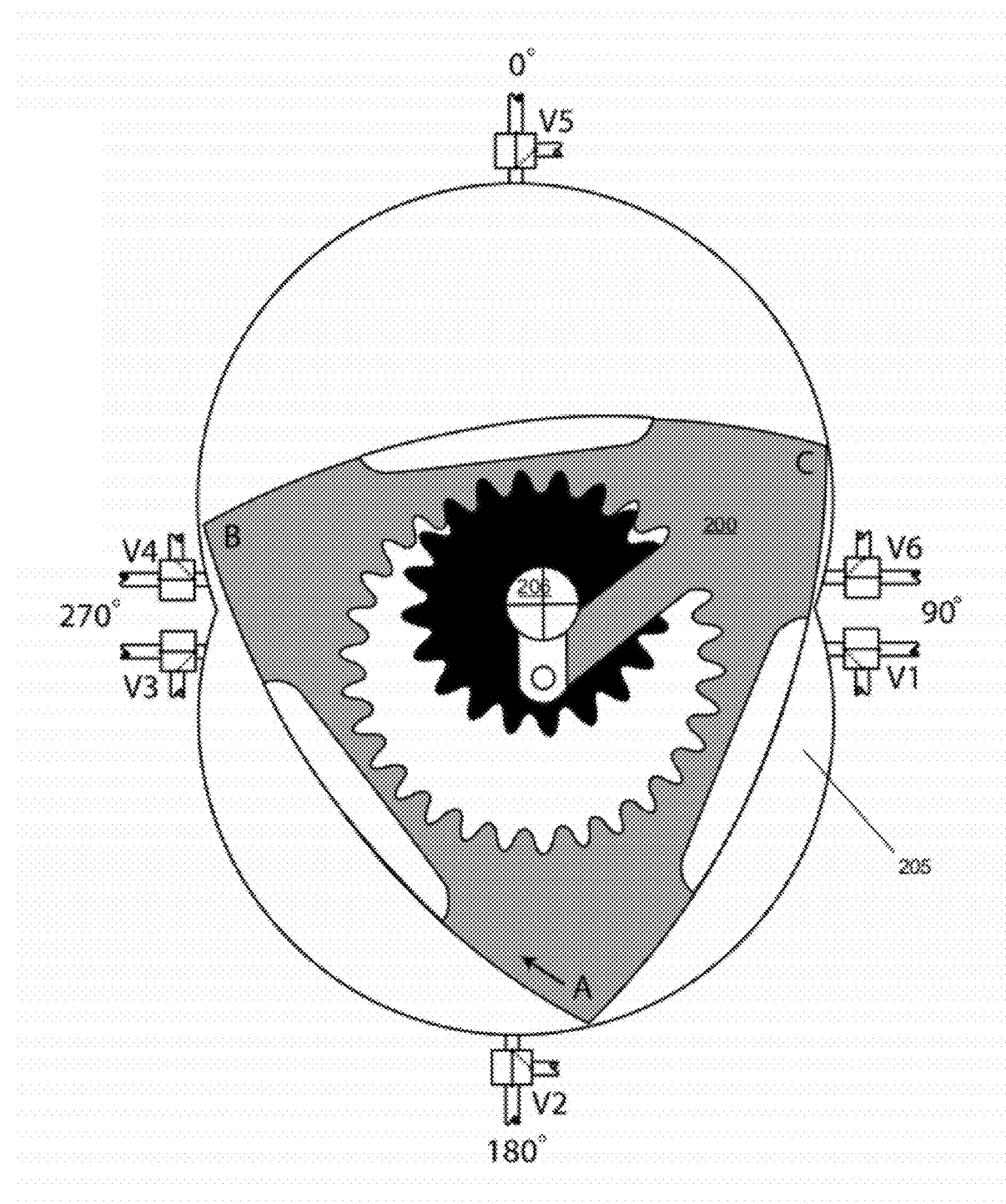
FIGS. 2-4 are a cutaway view showing three phases of a dual-mode rotary compressed air engine in accordance with another exemplary embodiment of the present invention.
Figure 3:
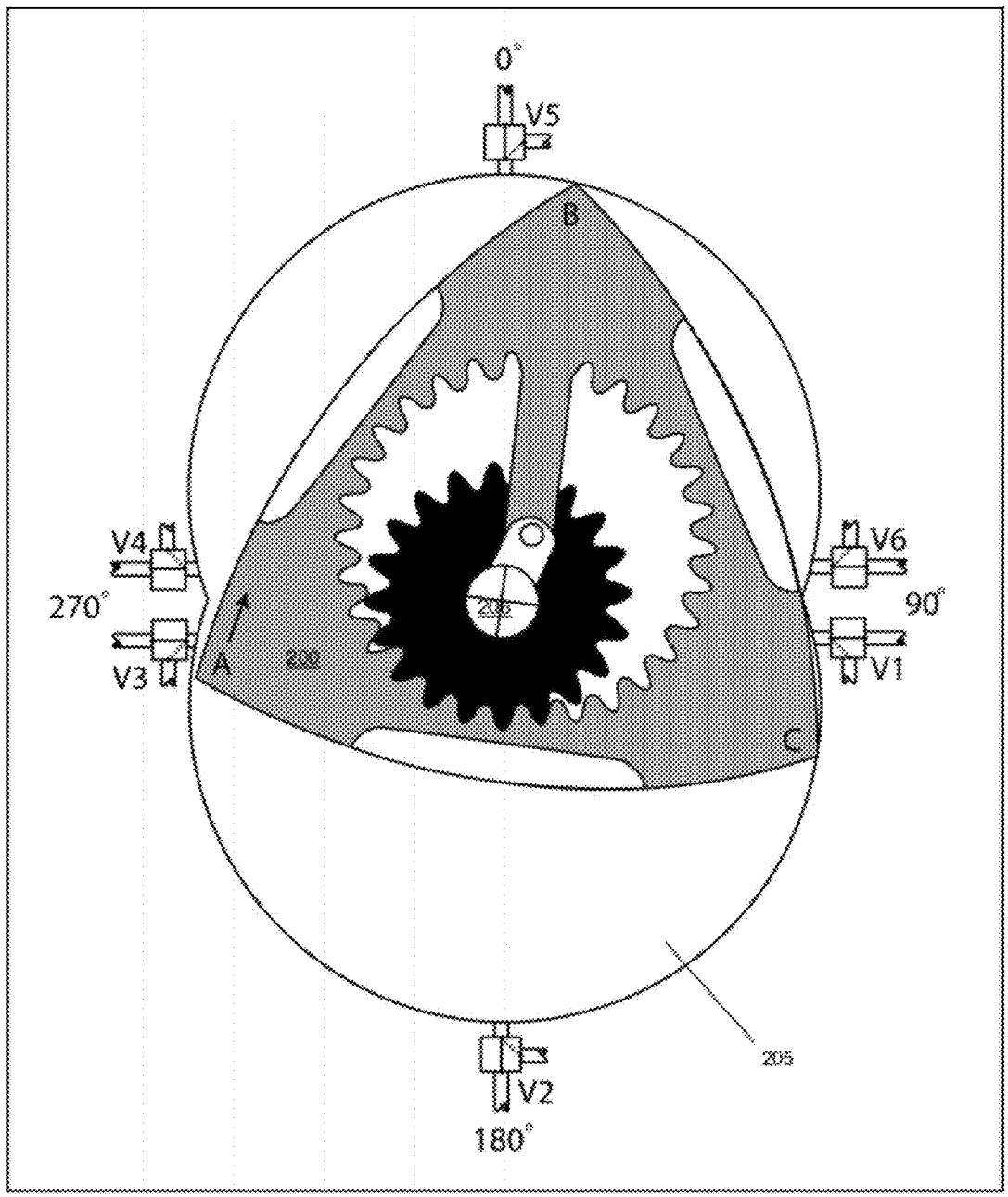
Figure 4:
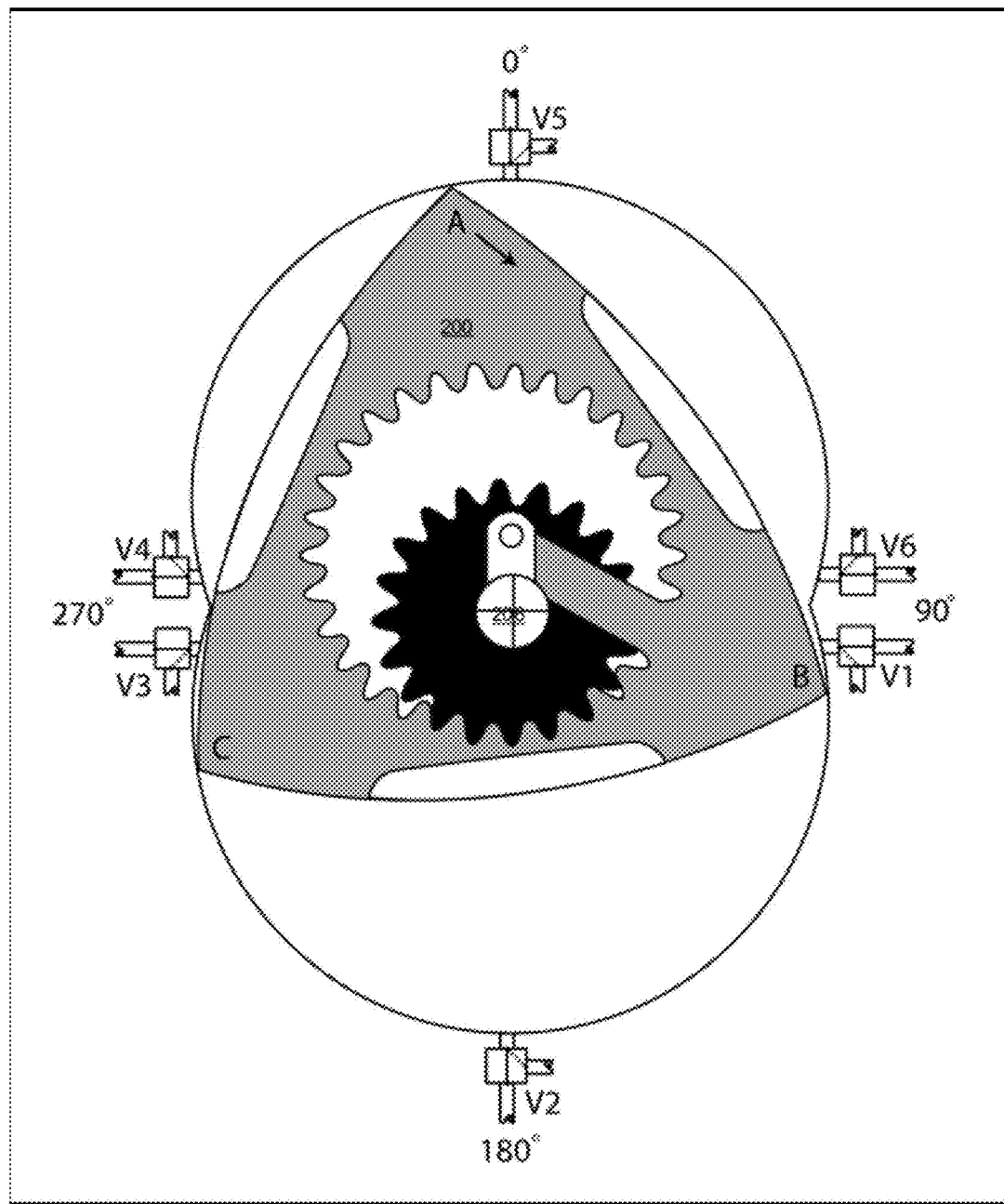

FIGS. 2-4 show similar processes for a rotary engine, with a rotor 200 in a rotary chamber that drives an output shaft 206. All valves normally are closed. A pressure vessel or supply is pressurized with air. Pressured air may be input into the pressure vessel through a valve or a separate fitting. In one example, the air is pressurized to approximately 2000 psi. In another exemplary embodiment, the air is at a pressure of approximately 4000 to 5000 psi, more particularly, 4300 psi.

During acceleration or maintenance of speed (i.e., power mode), the accelerator (or power switch) is engaged. As point C passes valve V1, a relatively small, high pressure bolus of air introduced from the pressure vessel or supply through valve V1 into the small rotor chamber plenum between C-A on the rotor (i.e., volume 205). In one example, the bolus of air is from 2 to 10 cubic millimeters in volume, although the volume depends on the size of the chamber and the amount of pressure on (or deflection of) the accelerator (i.e., a greater deflection of the accelerator results in more compressed being introduced to produce faster acceleration). The valve V1 closes, and the expanding air pushes the rotor 200 onward in its rotation (indicated by the directional arrow), transferring the expansive energy into the mechanical energy of the output shaft 206. As point C arrives at approximately 225 degrees (using the compass points as shown in the figures), valve V4 is energized and injects another metered bolus of compressed air into a corresponding small plenum. As point C passes 225 degrees and reaches approximately 270 degrees, valve V3 is engaged and fully expanded (and thermally cool) air in volume 205 is swept or discharged to atmosphere (or to an accumulator, if a closed system). As long as the accelerator is engaged, this process repeats continuously, with a metered bolus of compressed air being injected as one of the tips of the rotor passes each injection valve (valves V1 and V4), and the expanded air exiting through valves V2 and V5. As can be seen, in this embodiment, compressed air is injected on the opposing side at each moment a rotor tip are at the 90 degree or 270 degree positions. Accordingly, there are three power strokes per revolution of the output shaft (as compared to one power stroke for every two revolutions for a typical four-stroke internal combustion engine).

When the accelerator is released or disengaged, the engine becomes a compressor, in a similar fashion to the piston engine described above. The kinetic energy of the flywheel or vehicle in motion continues to move the output shaft, and thus the rotor. As rotation continues, air is drawn into the plenum through valve V1 as a point of the rotor passes the valve. As that point arrives at 225 degrees, the plenum is at its maximum displacement, valve V1 closes, and the continued rotation of the rotor begins to compress the air until it reaches a threshold pressure, causing valve V3 to open (in a similar manner to valve 202 described above). The compressed air is removed and stored in the pressure vessel or supply, or a separate accumulator. As the rotor continues to rotate, the same process occurs with valves V4 (input, like V1) and V5 (discharge, like V3). Valves V3 and V5 close as the pressure in their respective volumes drops. Provided the accelerator remains disengaged, this compression process repeats continuously, with a compressed bolus of air being removed on the opposite side at each moment a rotor tip is at the 90 degree or 270 degree. Thus, there are three compression strokes per revolution of the crankshaft.

In practice, the output shaft 106, 206 would be attached to an appropriately-sized flywheel, transmission, or wheel of a car, train, generator, or the like. When the accelerator (or power switch) is engaged, the engine runs on the compressed air as fuel. When the accelerator (or power switch) is disengaged, the momentum of the flywheel or wheel provides mechanical energy back through the engine, storing compressed air, thereby generating additional fuel. Depending on the engine and the work being done, it is expected that there will be some normal unrecoverable energy losses, such as heat, mechanical, and the like. However, the ability of the engine to generate its own fuel during the compression phase greatly increases the fuel efficiency and effective range of a vehicle with such an engine.

It should be noted that the engine shown in FIGS. 1-4 is a 2-cycle engine (i.e., power/exhaust, or compression/exhaust), in contrast to 4-cycle internal combustion engines (i.e., intake/compression/power/exhaust) currently used for transportation vehicles. The compressed air engine of the present invention thus leads to a simpler engine design with fewer components, and a smaller footprint. In one exemplary embodiment, the mass and footprint of an engine in accordance with the present invention is approximately 30% of current drive train systems, and may weigh approximately 700 pounds.

The present invention is not limited to a specific configuration of compressed air engine or compressed air supply apparatus. A different configuration or number of valves may be used. It further should be noted that the pressure vessel or pressure supply may be a separate pressurized tank or holding vessel connected to the piston or rotary chamber.

In yet another embodiment, the engine in expanded compressor mode can be used as a brake for a vehicle. The structure of the engine and components would have to be substantial to absorb the forces required to stop a multi-ton vehicle. The engine also may be used with standard braking mechanisms to assist in braking.

A braking mechanism can be incorporated into the simple engines of FIGS. 1 and 2-4. A brake pedal or actuator is engaged. With respect to FIG. 1, while the brake is engaged, port 109 from the pressure vessel 97 introduces pressurized air through valve 103 into the volume 105 at maximum displacement (see Position III in FIG. 1). The introduction of high pressure air into the volume creates a significant force as the piston or rotor now has to compress higher pressure air (as compared to normal atmospheric pressure air) as it moves to Position IV (FIG. 1). The amount of air that is introduced into the volume prior to the compression stroke or phase is dependent upon the force (and amount of depression) of the brake pedal. The lower the force, the smaller the amount of air introduced, and the less braking applied. It should be noted that this braking energy can be usefully transferred back into the pressure vessel, both in terms of heat and volume of air, as the air introduced is compressed (or re-compressed), and removed from the volume as described above during compression mode. (As will be apparent, this same braking effect can be accomplished in the embodiment shown in FIGS. 2-4 by the introduction of compressed air into the plenum at maximum displacement.)

In several embodiments, an important difference over the prior art is in the excitation and control of the two-way or three-way valves that (i) deliver compressed air for power or receive and direct compressed air to the pressure vessel, or pressurized tank or holding vessel, for in-situ or later used, (ii) draw air at atmosphere for compression, and (iii) inject compressed into the cylinder at maximum displacement for braking. These valves can be electronic (i.e., actuated with an electronic signal established from a timing mechanism) or mechanical. They can have two modes: a power mode and a compression mode. The mode can be determined by whether the operator has engaged the accelerator.

Figure 5:
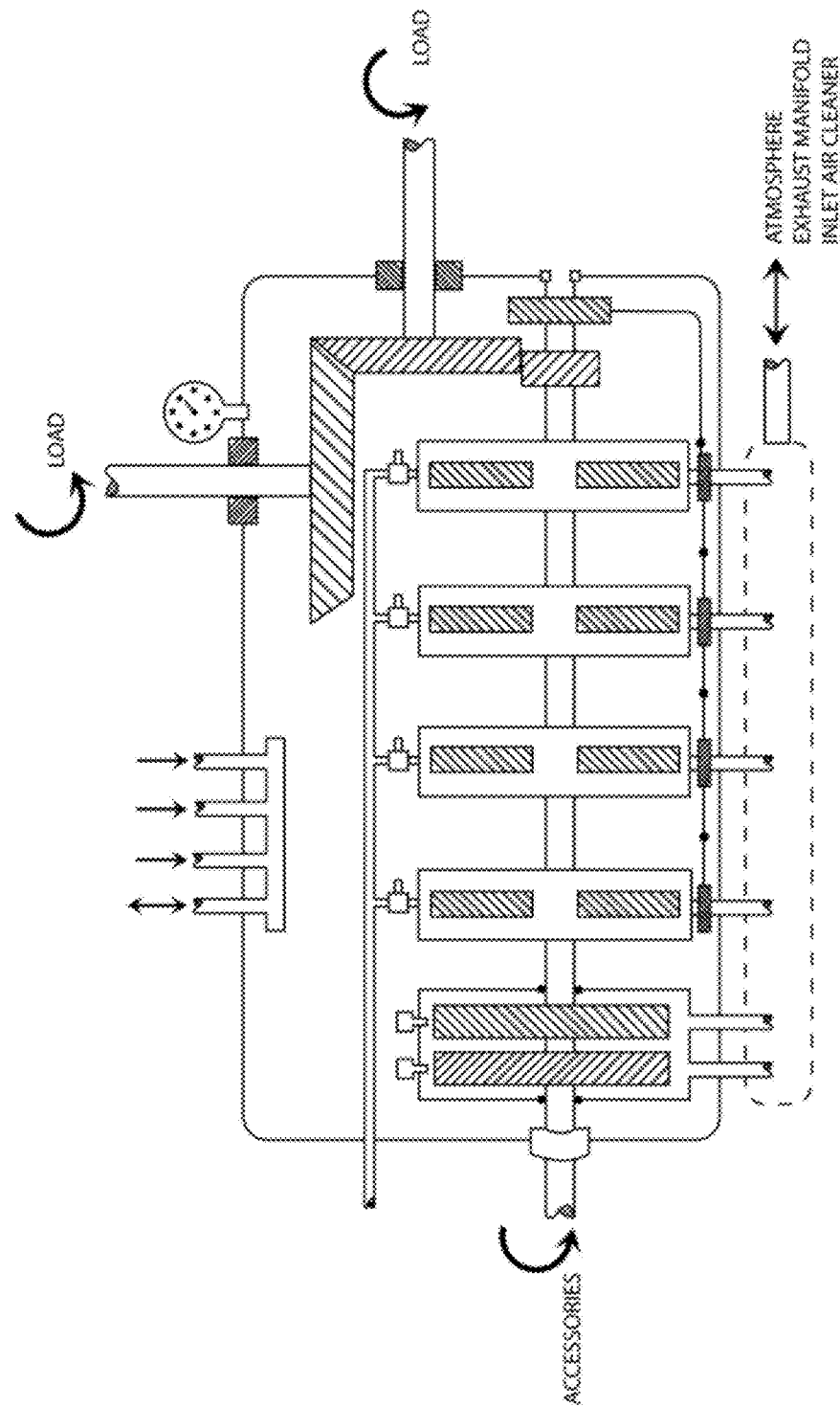
FIG. 5 is a top view of a compressed air engine with multiple rotors in accordance with another exemplary embodiment of the present invention.
Figure 6:
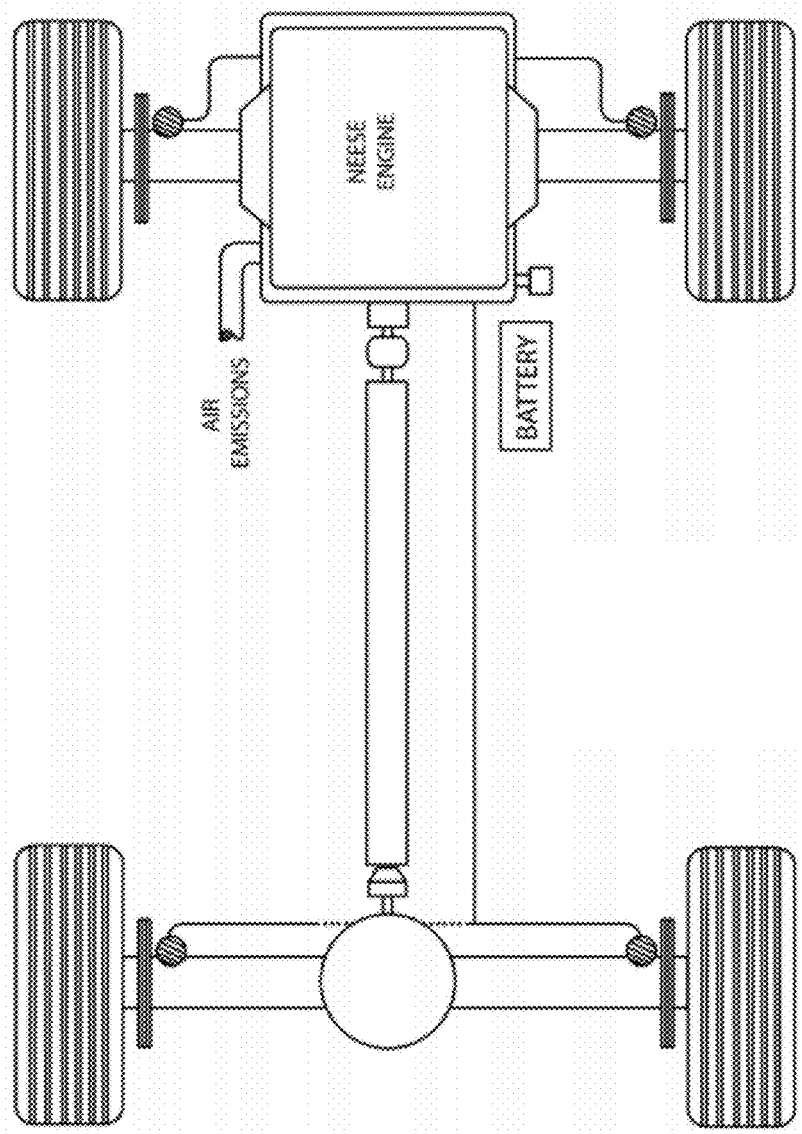
FIG. 6 is a top view of a compressed air engine in place on a motor-vehicle frame in accordance with another exemplary embodiment of the present invention.

FIG. 5 shows a top view of a engine with multiple rotors 300. A communication and control module provides valve timing and controls. Air or gas is introduced through the top inputs. Power is supplied to the transmission and wheels through mechanical connections ("LOAD"). The engine also generates electrical power which is used for electrical components of the vehicle ("ACCESSORIES"). FIG. 6 shows a view of an exemplary embodiment of a compressed air engine in place on a motor-vehicle frame. Of course, a compressed air engine may be located elsewhere on the frame.

Accordingly, exemplary embodiments of the present invention accomplish three distinct objectives. First, when accelerating or maintaining velocity, the engine efficiently uses the energy of compressed air to deliver mechanical power to a driveshaft, with power efficiency of up to approximately 95 to 97%. Second, when not accelerating or maintaining velocity, the internal power valves disengage, transforming the engine to a compressor whereby the motion of the vehicle causes air to be accumulated, compressed and stored. Third, the engine may act as a co-generative braking device which uses the kinetic energy of the braking vehicle to recapture a substantial quantity of compressed air.

Compressed air also can be generated from the up-and-down movement of a vehicle while in motion. Shock absorbers are an integral part of nearly every vehicle. They prevent abrupt shocks due to bumps and dips in the road from being passed on to the passengers and cargo. Typically, shock absorbers absorb these impacts by transferring energy to an internal fluid. In one embodiment, the present invention comprises a shock absorber that acts instead on a column of air. This type of absorber could be located at the bottom of the vehicle and attached to a wheel in the same fashion as shock absorbers known in the art. Each time the wheel encounters a bump in the road, a piston in the shock absorber compresses a column of air. The weight of the vehicle provides the downward force for this compression. After a small volume of air has been compressed, it leaves the chamber through a valve. The air chamber is then refilled with outside air when the piston returns to its original position.

If the encountered bumps are small, it will be difficult to compress a volume of air to the high pressure desired in one action. The compression factor can be greatly increased by breaking the action into several stages. At each stage, a small volume of air is compressed and passed to the next stage, eventually reaching the desired pressure, which may be 2000 to 4300 psi, or more.

It should be noted that the air volume cannot be compressed past the point where the force on the piston due to air pressure equals the weight of the vehicle. The piston may be able to move slightly past this point, but will quickly be stopped by the increasing air pressure. The combined force of all stages of the compression system must be taken into account when considering this balance. Since each stage has a different volume, the areas of the corresponding pistons are different. However, the heights of the air columns and the compression distances are the same.

While the volume of air compressed at each impact is small, the large number of bumps encountered on even a very smooth road or highway ("smooth" as defined by the U.S. Department of Transportation) allow for a large volume to be compressed throughout the journey. The U.S. Department of Transportation states that the smoothest U.S. highway road contains one 2-mm high bump every 10 to 100 cm. At this frequency, a vehicle tire will encounter 100,000 to 1,000,000 bumps in 60 miles of highway driving.

As an example, a 2008 Chevrolet Suburban (3727 kg mass) traveling at 60 mph for one hour requires 95.2 MJ of energy, which could be provided by 680 L of air compressed to 4300 psi. A 3-stage "shock absorber" system may be used to compress air while the vehicle is in motion. To increase the pressure from 14.7 (atmospheric) to 4300 psi, each stage must increase pressure and decrease volume by a factor of 6.64. Each air column is compressed from a height of 2.35 mm to a height of 0.35 mm for a displacement of 2 mm (the height of the bump) and a compression factor of 6.64. In order for the compression to take place, the combined air pressure cannot exceed the weight of the vehicle (mg=3727.3 kg×9.81 m/s$^2$=36,565 N).

The following table shows the initial and final pressures and volumes, as well as the piston area, of each of the three stages in this exemplary embodiment.

| | Pressures, volumes, and piston areas for a 3-stage compressor system acting on a 3727-kg vehicle. | | | | | | |
|---|---|---|---|---|---|---|---|
| | Pressure | | | | Piston | Volume | |
| | Initial | | Final | | Area | Initial | Final |
| Stage | Pa | psi | Pa | psi | cm$^2$ | mL | mL |
| 1 | 101325 | 14.7 | 672616 | 97.6 | 181.21 | 42.67 | 6.43 |
| 2 | 672616 | 97.6 | 4464958 | 647.6 | 27.30 | 6.43 | 0.97 |
| 3 | 4464958 | 647.6 | 29639286 | 4298.7 | 4.11 | 0.97 | 0.15 |

As shown in the table, a packet of air traveling through the 3-stage compression system is compressed to a volume of 0.15 mL at a pressure of 4300 psi. The calculated range of the minimum energy contribution therefore on the most ideal highway, is 20% up to 45% of the energy required for the vehicle. This assumes impulses per tire to be 50%. Two million such compressions (500 k per shock absorber, averaging 100 k to 1,000 k) yield a total compressed air volume of approximately 300 L, or about 45% of the compressed air needed to power the vehicle for the entire journey.

Figure 7:
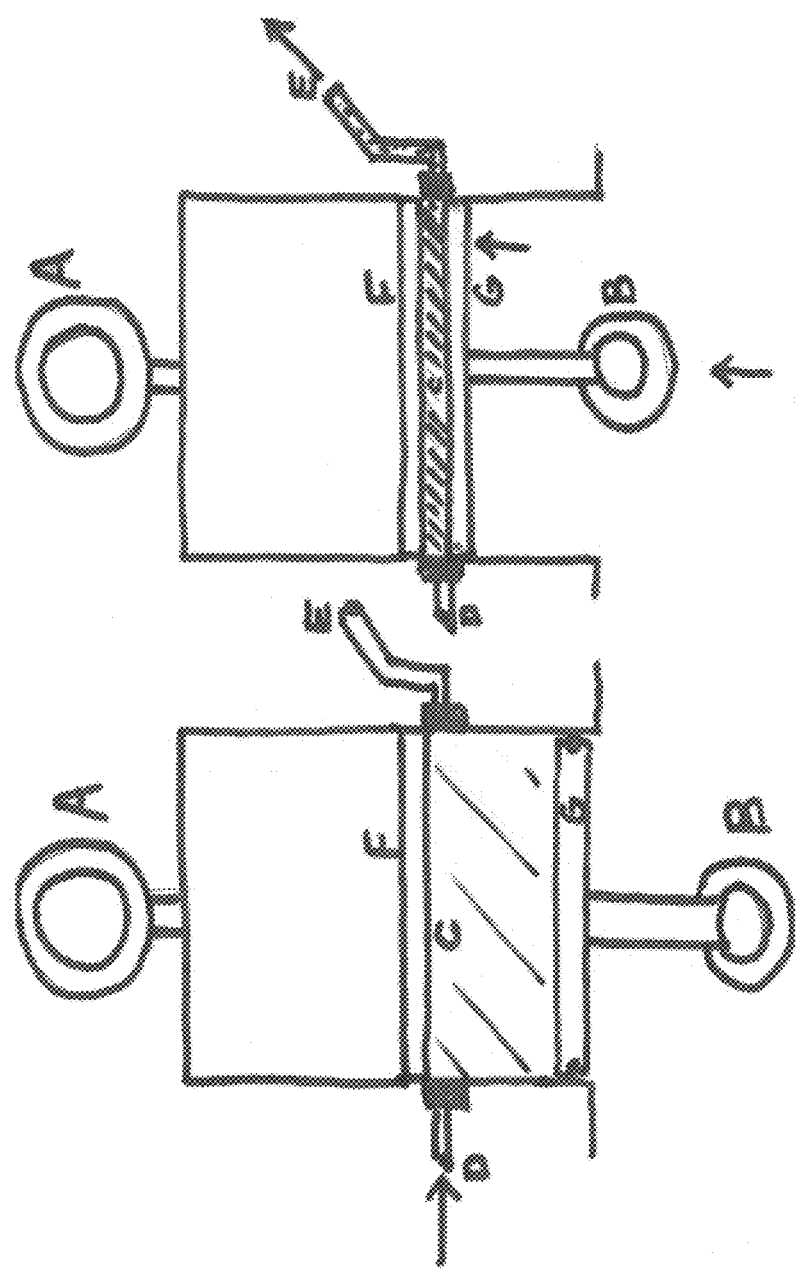
FIG. 7 is a view of a shock absorber with air compression generation in accordance with another exemplary embodiment of the present invention.

FIG. 7 shows an embodiment of a dual mode shock-absorber that dampens the impulses imparted to the vehicle by the ground or roadway, and also uses this kinetic energy to compress air (or some other gas) as described above. In this illustration, mount "A" is attached to the vehicle and mount "B" is attached to the vehicle wheel assembly (which imparts the road impulses to the device). In steady state, volume "C" is at atmosphere or under slight pressure, and is provided this state through port/valve "D" (which also may incorporate a check valve), and remains closed. Port/valve "E" is closed (which also may incorporate a check valve). Upon receiving an impulse (road bump) from the tire assembly "B", piston surface "G" compresses this gas/air against piston surface "F". Upon reaching the breaking pressure, nominally a compression ratio of 7:1 to 10:1, the valve opens and the compressed air is evacuated in its compressed state into transport line "E". Piston "G" then immediately moves back either by the tire assembly returning to its original position or with the assistance of a return spring force applied to "B", if needed.

This vertical movement also can be used to compress air indirectly, or as described in U.S. Pat. No. 6,925,060, which is incorporated herein by reference in its entirety for all purposes, to generate electricity through the movement of the shock absorbers. In the latter case, the electricity generated can be used to run air compressors in the vehicle to generate compressed air for storage and use.

In yet another exemplary embodiment, one or more turbines may be placed on the vehicle to compress air or gas for storage or use in the engine. Turbines are known in the prior art. Since there is no radiator on a vehicle using a compress-air or compress-gas engine in accordance with embodiments of the present invention, air resistance could be reduced and more importantly, applied in terms of energy generation and storage. While there is little that can be done about air molecules that impact the windshield or headlights except to add to the downward force (or greater force on the shock absorber), there is a significant portion of surface area on the front face of a vehicle that serves less immediate purpose. This surface area could instead be devoted to an energy storage system using the impact of air molecules to turn the blades of a wind turbine.

Figure 8:
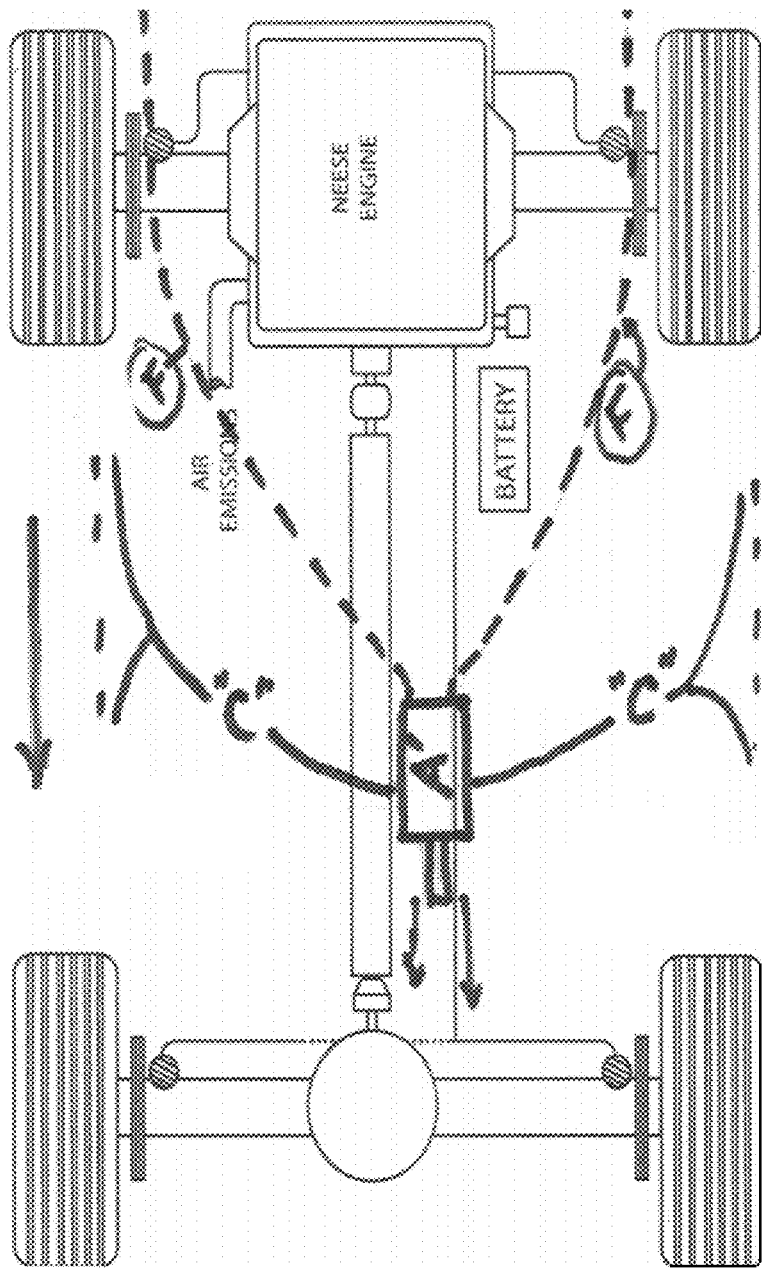
FIG. 8 is a view of a turbine system with air compression generation in accordance with another exemplary embodiment of the present invention.
Figure 9:
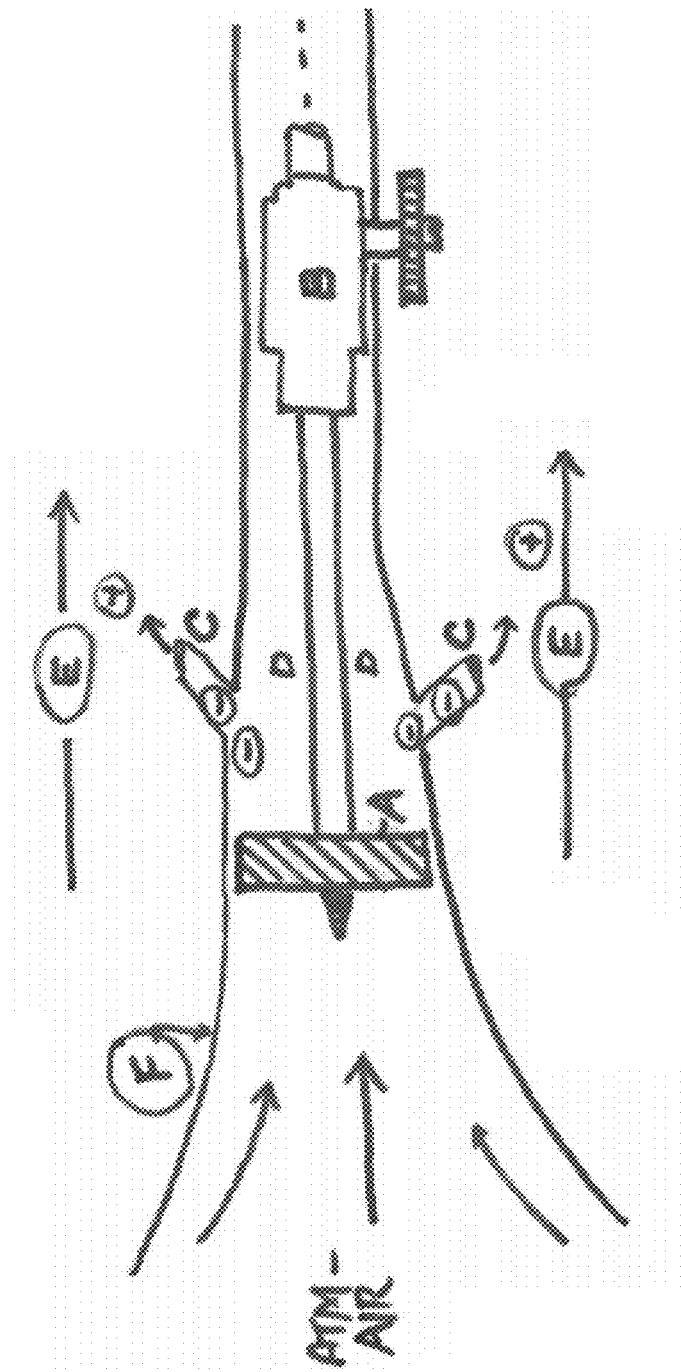
FIG. 9 is a detailed view of a turbine system with air compression generation in accordance with another exemplary embodiment of the present invention.

As seen in FIGS. 8 and 9, a turbine generates rotational shaft power applied to compressing air or gas. Turbines often have a shroud surrounding the blades to direct air through the blades and increase velocity. In one embodiment, the turbine or turbines used in the present invention is sized to maintain a small footprint appropriate for a particular vehicle, and may be approximately 2 to 3 times the size of current passenger vehicle turbochargers. The turbine may be located in the vehicle engine compartment, or on the read undercarriage near the rear wheels. The turbine should not add a new drag load to the vehicle, such as by placement on the vehicle roof, as the energy required to overcome the additional drag would be more than the energy generated.

FIG. 9 shows a detail of a exemplary turbine "B". As air is forced through the insulated plenum "F", it first encounters a set of fixed blades, called the stator, which redirect the air onto a set of movable blades called the rotor. The air turns the rotor thereby transferring its energy to shaft power, consolidated in a gear box ("B") or a three stage compressor ("B"). The air emerges on the other side, moving more slowly now than the air flowing outside the turbine. The shroud is shaped so that it guides this relatively fast-moving outside air into the area just behind the rotors.

In one embodiment, the slip stream is used to create a negative pressure downstream of the rotor ("D"), which in turn, provides a much higher energy conversion ratio. The turbine itself would indeed provide useful compressed air/gas, but it would not be optimized. Consider the front of the vehicle to have 2.3 m$^3$ of available air flow into the plenum "F" and the inlet of the turbine to be 0.23 m$^3$ of inlet area. This assures that the air would need to be compressed nominally, 10:1, as it enters turbine "A". The energy to provide this work would normally come from the air flow itself or, in practice, would in and of itself create a drag component to the vehicle (albeit much less than the current radiator). The benefit herein, also, is that the negative pressure component contribution is proportional to the speed of the vehicle, such that, ultimately the energy output measured at "B" is proportional to the velocity of the vehicle.

It is known in practice, that for every CFM of air movement (such as in the HVAC system of a residence) that 2 CFM are entrained, or the air discharge creates negative pressure that induces entrainment. In this case, the slipstream all around a moving vehicle provides such negative pressure, to such end, that multiple connections from sub plenum "D" to the slipstream "E" about and around the vehicle, will impart a significant negative pressure to Plenum "D", thus increasing the flow through turbine "A". Locating the turbine toward the rear of the vehicle would provide an additional advantage of a known negative pressure source found directly behind a moving vehicle.

As a specific example, a Chevrolet Suburban is 76.8 inches tall and 79.1 inches wide, with a ground clearance of 9.1 inches. The surface area facing oncoming wind is therefore:

(76.8 in−9.1 in)79.1 in=5355 in²=3.45 m²

Approximately ⅓ of this area is devoted to the windshield and headlight, leaving 2.3 m² available area for a wind turbine. Note that this turbine does not actually need to be located on the front of the vehicle. It is sufficient that the air can be directed through an plenum to in an efficient manner. The plenum may be insulated to reduce noise.

Assume the vehicle travels at a speed of 60 mph, or 27.8 m/s. The power generated is:

$$P = \frac{1}{2}\rho A C_p v^3 N_g N_b,$$

where the air density $\rho=1.2$ kg/m³, $A=2.30$ m², $v=27.8$ m/s, and $C_p=0.45$. The last two variables are efficiencies of the turbine, which are known be very close to 1. Using these parameters, the power generated by the turbine(s) is 13.34 kW. For an hour's drive, this is (13.34 kW) (3600 s)=48.0 MJ of energy. There will be approximately 1-5% normal mechanical/bearing/heat losses, which are offset by the reduction in frictional air resistance with the removal of the radiator. When this 48 MJ of energy from the turbine is combined with the 42 MJ made available by the previously discussed shock absorber compression system, these energy replenishing devices could provide a cumulative approximately 90 MJ (94% of the total) of the energy needed to power the vehicle throughout its journey.

A vehicle with a compressed air engine in accordance with different exemplary embodiments of the present invention possesses several distinguishing benefits over current vehicles. It is not vehicle mass dependent. The energy efficiency greatly exceeds that of an internal combustion engine. A wide range of horsepower can be achieved (e.g. 5 to 500 hp) with only nominal changes in the engine displacement. There are no harmful emissions (i.e., the only emission is cool or cold air). A compressed air fuel tank can be of modest size (i.e., 50 gallons or less) and modest pressure (e.g., approximately 2000 psi), and thus fit in current vehicle designs. The engine can deliver power equal to or greater than an internal combustion engine. It has significant range, even without support from other energy sources, such as the shock absorbers, and would not need to be replenished except at intervals/ranges similar to those in present vehicles (e.g., 300 to 500 miles, or more), as it regenerates its own fuel. The engine itself may be simpler in design, with approximately 78% fewer moving parts in one embodiment. The vehicle would not require a radiator, muffler, catalytic converter, A/C compressor, and other components needed to support an internal combustion engine.

Figure 10:
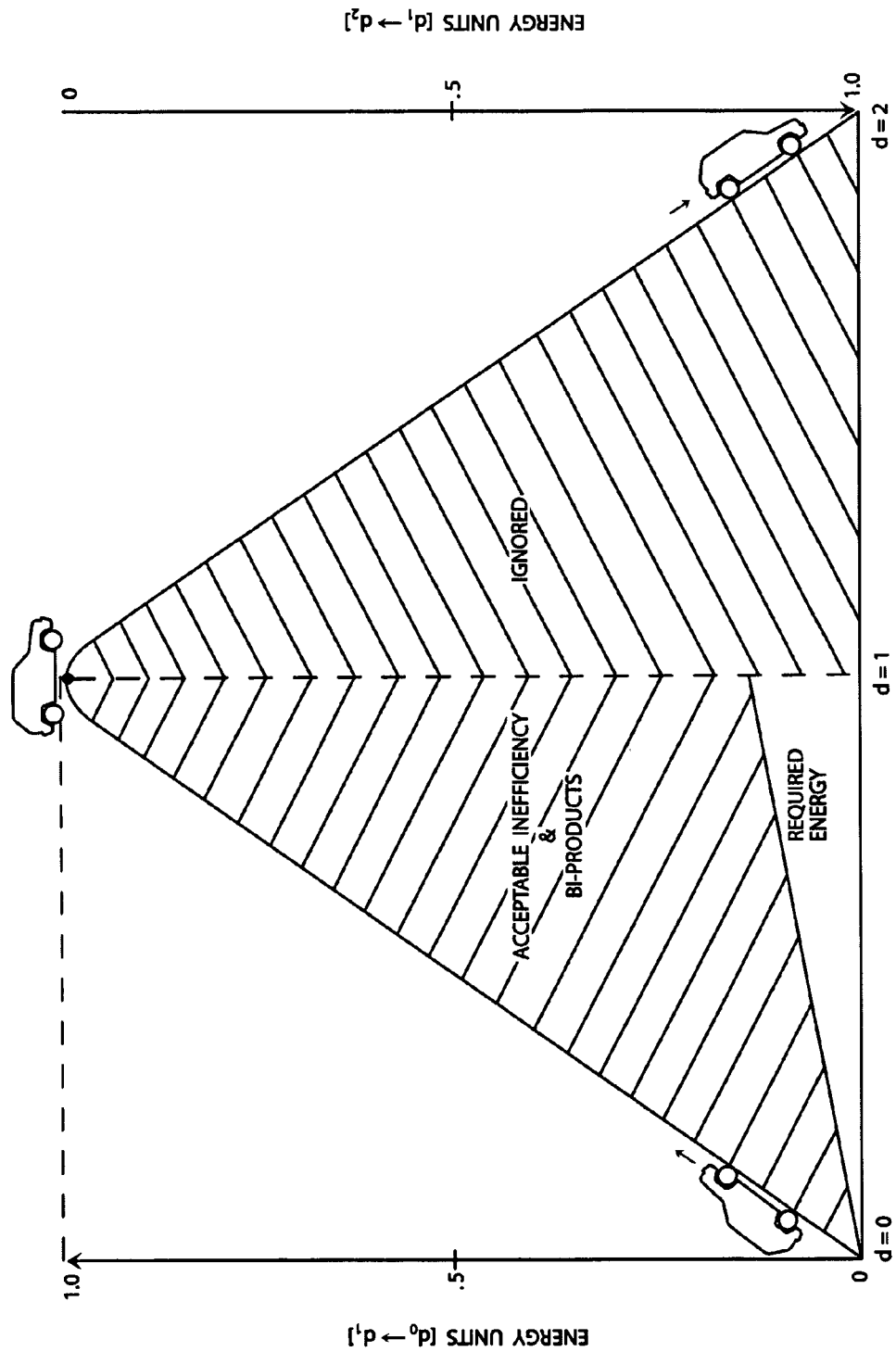
FIGS. 10 and 11 are graphical comparison of the relative advantages of an air-powered vehicle in accordance with an embodiment of the present invention over the prior art.
Figure 11:
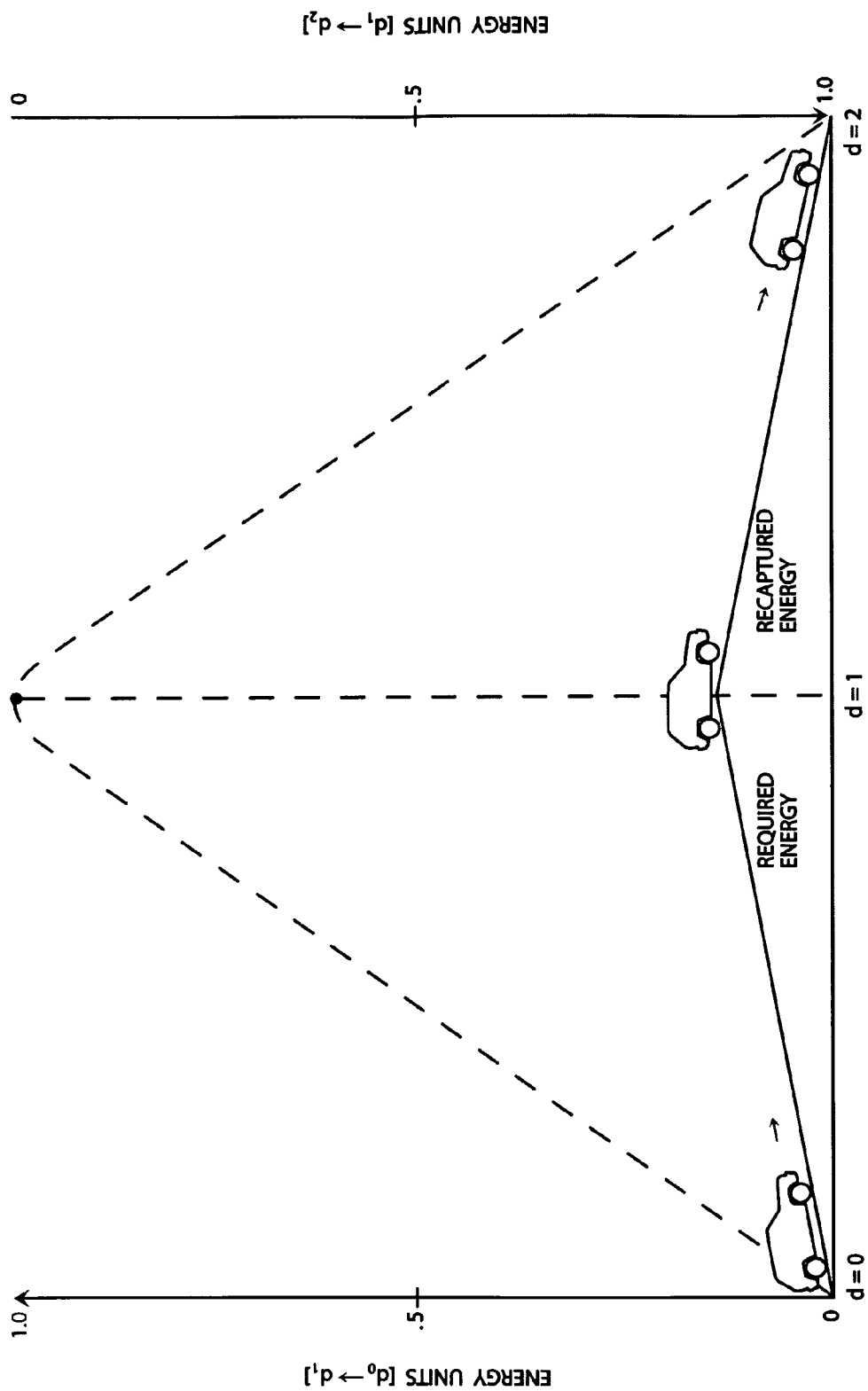

FIGS. 10 and 11 show an illustrative graphic summary of the benefit of the present invention. FIG. 10 shows an energy efficiency graph for an internal combustion vehicle in the current art, showing the theoretical energy required to move or accelerate the vehicle a certain distance (from d=0 to d=1), assuming no inefficiencies, with a substantial additional energy requirement due to losses and inefficiencies inherent to internal combustion engines. The area from d=1 to d=2, representing the movement of the vehicle with the accelerator disengaged, demonstrates the amount of kinetic energy from the slowing vehicle that is lost or ignored.

FIG. 11 shows a vehicle of the same weight using an engine in accordance with an exemplary embodiment of the present invention. Due to the higher efficiency, the energy actually used is much closer to the theoretical energy required, and some or all of the kinetic energy from the slowing vehicle is recaptured.

It should be noted that various embodiments of the present invention may be open or closed. In open configurations, there is communication with the atmosphere, with air being brought into the engine, and cold air being emitted as "exhaust." In closed configurations, there is no communication with the atmosphere, and a separate accumulator or tank can be used to hold air at low pressure or atmospheric pressure (i.e., the accumulator takes the place of the atmospheric connection). Closed configurations allow the present invention to take advantage of thermal efficiencies as air is heated and cooled due to compression and expansion. Closed configurations also allow gases other than air to be used, with different properties allowing even greater efficiencies. Such replacement gases include carbon dioxide, nitrogen, and the like. Accordingly, while embodiments described herein refer to air, it should be understand that a variety of gases can be used.

Thus, it should be understood that the embodiments and examples have been chosen and described in order to best illustrate the principals of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A power train system, comprising:
   a compressed air or gas supply;
   an accelerator or power switch;
   a compressed air or gas engine with at least one internal chamber configured for extracting energy from compressed air or gas, said engine operating in a first mode when the accelerator or power switch is engaged, and a second mode when the accelerator or power switch is not engaged, and
   at least three valves in communication with the internal chamber, said valves comprising an inlet valve, an equalizing valve, and a compression valve,
   wherein in said first mode the chamber in the compressed air or gas engine receives said compressed air or gas through the inlet valve from the compressed air or gas supply, said compressed air or gas subsequently expanding inside said chamber during an expanding power stroke and producing power via an output shaft, the equalizing valve opening at or near the end of the expanding power stroke at or near maximum chamber volume thereby allowing the chamber to normalize to or near ambient pressure, and during a return power stroke air or gas in the chamber exits through the inlet or compression valve, and further wherein in said second mode the chamber in the compressed air or gas engine receives low or ambient pressure air or gas through the inlet valve, said low or ambient pressure air or gas subsequently being compressed until reaching a threshold pressure sufficient to cause the compression valve to open and deliver the compressed air or gas to a storage tank or to the compressed air or gas supply, while the equalizing valve remains closed.

2. The system of claim 1, wherein the compressed air or gas engine comprises a reciprocating piston engine.

3. The system of claim 1, wherein the compressed air or gas engine comprises a rotary engine.

4. The system of claim 1, wherein the first mode and second mode cannot be in operation simultaneously.

5. The system of claim 1, wherein the first mode is implemented by engaging an accelerator.

6. The system of claim 1, wherein the second mode is implemented by disengaging an accelerator.

7. The system of claim 1, wherein the output shaft produces the compression of the ambient pressure air or gas.

8. The system of claim 1, wherein the output shaft is used to power one or more wheels on a vehicle.

9. The system of claim 1, further comprising a third mode wherein compressed air or gas is introduced into the chamber in the compressed air or gas engine at or near maximum chamber volume through the inlet valve to provide braking.

10. The system of claim 9, wherein the amount of compressed air or gas introduced is controlled by the amount of depression of a brake pedal.

11. The system of claim 9, wherein the compressed air or gas in the chamber is subsequently compressed until reaching a threshold pressure sufficient to cause the compression valve to open and deliver the compressed air or gas to a storage tank or to the compressed air or gas supply, while the equalizing valve remains closed.

12. The system of claim 1, wherein the compressed air or gas supply is stored in the hollow body of the portion of the engine surrounding the internal chamber.

13. The system of claim 1, wherein the compressed air or gas supply is stored in a separate pressured tank or holding vessel in communication with the internal chamber.

14. The system of claim 1, wherein the compressed air or gas supply is stored at a pressure of 4000 to 5000 psi.

15. The system of claim 1, further wherein the power train system is a component of a motor vehicle.

16. The system of claim 15, further comprising one or more shock absorbers attached to the motor vehicle, each shock absorber comprising a chamber with a piston, the piston moving within the chamber in response to movements of the motor vehicle, wherein air or gas is introduced into the shock absorber chamber at or near maximum volume of the chamber, and removed from the shock absorber chamber when the air or gas is compressed, the compressed air or gas thereupon be sent to the compressed air or gas supply for use in the engine.

17. The system of claim 16, wherein the compression occurs over multiple stages.

18. The system of claim 15, further comprise one or more turbines embodied within the motor vehicle, whereby the turbines provided compressed air or gas to the compressed air or gas supply for use in the engine.

19. The system of claim 18, wherein 20% or more of the energy required to move the vehicle is generated from the one or more shock absorbers and the one or more turbines.

20. The system of claim 18, wherein at least 45% of the energy required to move the vehicle is generated from the one or more shock absorbers and the one or more turbines.

* * * * *